(12) United States Patent
Shan

(10) Patent No.: US 11,664,013 B2
(45) Date of Patent: May 30, 2023

(54) SPEECH FEATURE REUSE-BASED STORING AND CALCULATING COMPRESSION METHOD FOR KEYWORD-SPOTTING CNN

(71) Applicant: SOUTHEAST UNIVERSITY, Nanjing (CN)

(72) Inventor: Weiwei Shan, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 138 days.

(21) Appl. No.: 17/112,287

(22) Filed: Dec. 4, 2020

(65) Prior Publication Data

US 2021/0118429 A1    Apr. 22, 2021

(51) Int. Cl.
G10L 15/02    (2006.01)
G10L 15/08    (2006.01)
G10L 15/16    (2006.01)

(52) U.S. Cl.
CPC .............. G10L 15/08 (2013.01); G10L 15/02 (2013.01); G10L 15/16 (2013.01); G10L 2015/088 (2013.01)

(58) Field of Classification Search
CPC ......... G10L 15/08; G10L 15/02; G10L 15/16; G10L 2015/088; G10L 15/063; G10L 15/25; G10L 25/30; G10L 2015/025
See application file for complete search history.

(56) References Cited

U.S. PATENT DOCUMENTS

| | | | |
|---|---|---|---|
| 2016/0063996 A1* | 3/2016 | Chen | G10L 15/12 704/255 |
| 2018/0261213 A1* | 9/2018 | Arik | G10L 15/063 |
| 2019/0197083 A1* | 6/2019 | Chen | G06N 3/063 |
| 2021/0073481 A1* | 3/2021 | Gomez | G06F 40/263 |
| 2021/0089874 A1* | 3/2021 | Shan | G06N 3/04 |

OTHER PUBLICATIONS

S. Zheng et al., "An Ultra-Low Power Binarized Convolutional Neural Network-Based Speech Recognition Processor With On-Chip Self-Learning," in IEEE Transactions on Circuits and Systems I: Regular Papers, vol. 66, No. 12, pp. 4648-4661, Dec. 2019 (Year: 2019).*

(Continued)

*Primary Examiner* — Bhavesh M Mehta
*Assistant Examiner* — Nandini Subramani
(74) *Attorney, Agent, or Firm* — CBM Patent Consulting, LLC

(57) ABSTRACT

It discloses a speech feature reuse-based storing and calculating compression method for a keyword-spotting CNN, and belongs to the technical filed of calculating, reckoning or counting. If the updated row number of input data is equal to a convolution step size, every time new input data arrive, an input layer of a neural network replaces the earliest part of the input data with the new input data and meanwhile adjusts an addressing sequence of the input data, thereby performing an operation on the input data and corresponding convolution kernels in an arrival sequence of the input data, and an operation result is stored in an intermediate data memory of the neural network to update corresponding data.

2 Claims, 8 Drawing Sheets

(56) References Cited

OTHER PUBLICATIONS

Ding, W., Huang, Z., Huang, Z., Tian, L., Wang, H., & Feng, S. (2019). Designing efficient accelerator of depthwise separable convolutional neural network on FPGA. Journal of Systems Architecture, 97, 278-286 (Year: 2019).*

Huimin Li, Xitian Fan, Li Jiao, Wei Cao, Xuegong Zhou and Lingli Wang, "A high performance FPGA-based accelerator for large-scale convolutional neural networks," 2016 26th International Conference on Field Programmable Logic and Applications (FPL), 2016, pp. 1-9) (Year: 2016).*

* cited by examiner

|  | Intermediate data storage (bit) | Calculation amount (time) | | Parameter memory space (bit) |
| --- | --- | --- | --- | --- |
|  |  | 8 bit | 1 bit |  |
| Before reuse | 7840 | 102400 | 49248 | 3456 |
| After reuse | 2240 | 5120 | 3616 | 3456 |
| After reuse/Before reuse (%) | 28.6% | 5% | 7.34% | 100% |

FIG. 8

SPEECH FEATURE REUSE-BASED STORING AND CALCULATING COMPRESSION METHOD FOR KEYWORD-SPOTTING CNN

This application claims priority to Chinese Patent Application Ser. No. CN202010092688.6 filed on 14 Jan. 2020.

FIELD OF TECHNOLOGY

The present invention relates to a low-power circuit design, in particular to a low-power storing and calculating compression design for a keyword-spotting circuit, particularly relates to a speech feature reuse-based storing and calculating compression method for a keyword-spotting CNN, and belongs to the technical filed of calculating, reckoning or counting.

BACKGROUND

A keyword-spotting technology is an important branch of a speech recognition technology and presents as an entrance of speech recognition in general and is mainly used for waking a machine up. The difference between the keyword spotting technology and a universal large-scale semantic recognition technology lies in that for keyword spotting, it is only needed to recognize whether one or some specific words are included in a speech signal without completely recognizing the meaning of the entire section of the speech signal; and it plays a role as a switch of a device and must be in a normally-open state, such that its power is extremely important. It is necessary to design a keyword-spotting circuit small in resource occupancy and low in power.

An end-to-end neural network keyword-spotting system is a novel keyword-spotting system, and a recognition process from the speech signal to an output result is a forward reasoning process of one neural network and is usually achieved by using a Convolutional Neural Network (CNN). Therefore, designing a low-power neural network circuit is necessary. In the design of a neural network processor, due to a large parallel calculation amount, parameters and intermediate data to be called are dramatically increased accordingly, which makes the processor frequently access a storage module, and the access-storage power is one of main sources of the power of the neural network processor. Accordingly, in many designs, research and analysis are usually focused on a parallel calculation feature of the neural network and how to reduce the access storage frequency by means of rational data reuse so as to reduce the power of the neural network processor to improve the energy efficiency, and two common data reuse modes are an input data reuse mode and a storage reuse mode.

On the basis of the parallel calculation feature of the convolutional neural network, the present invention reduces the access storage frequency by reusing a speech feature data flow and meanwhile reduces the calculation amount of the neural network, thereby reducing the power of the neural network circuit, making the neural network maintain an ultra-low-power running state and complete a keyword-spotting function in a normally-open state, and improving the energy efficiency of the circuit.

SUMMARY

In view of the defects in the above background art, the objective of the present invention is to provide a speech feature reuse-based storing and calculating compression method for a keyword-spotting CNN, which is suitable for a convolutional neural network and transformations thereof, for example, a Depthwise-Separable Convolutional Neural Network (DSCNN), and the power of a circuit is effectively reduced by compressing a storage amount and a calculation amount.

For achieving the above objective, the present invention uses the following technical solution:

the present invention is focused on a calculation feature of a neural network of a keyword recognition circuit in speech application and uses a speech feature data flow reuse mode specially for features of convolution calculation in speech processing, thereby remarkably reducing the storage amount and calculation frequency. This convolution calculation herein includes a conventional convolutional neural network and the transformations thereof, for example, a depthwise-separable convolutional neural network (DSCNN), their common feature lies in that a size of a convolution kernel is less than a size of input data, and each convolution operation only calculates a part of the input data, such that the entire input data need several convolution operations to be completed.

According to input features of the keyword-spotting speech feature data, only one frame of feature values is updated in the input features of two adjacent sets of speech data usually, each convolution operation of the convolutional neural network only relates to a part of the input data, repeated operations on the identical input data exist in several convolutional operations, while an actual convolution output result only updates the data related to the newest input frame, the remaining convolution results are consistent with the last round of convolution results, and only data sequences are different. This feature results in redundancy storage and repeated calculation in the convolution operation performed through a conventional method. For reducing the repeated storage and calculation, the present invention performs optimizations as follows: (1) for an input layer, only the data related to the current newest frame are stored; (2) for the intermediate data subjected to the convolution operation, each layer only needs to store a memory space with a size equivalent to that of a convolution kernel of the next layer, and the storage amount of the intermediate data of each layer is related to the size of the convolution kernel of the next layer, such that a large number of memory resources is reduced; and (3) in addition, the convolution operation only performs the calculation related to the data of the current updated frame, which avoids a repeated calculation process and also saves a large number of calculation periods. A frame reuse calculation mode of the present invention reduces the convolution calculation amount and reduces a storage scale of the intermediate data, thereby greatly reducing the circuit power.

The speech feature reuse-based storing and calculating compression method for the keyword-spotting convolutional neural network circuit includes the following five points.

(1) The storage row number of the input data is compressed into a size of a first dimension N of the convolution kernel of the input layer, wherein N is an integer≥m.

(2) The repeated calculation process is removed, and according to the different convolution step sizes, two conditions are included as follows.

In the first condition, the updated row number of the input data is equal to the convolution step size (m=s); every time new input data arrive, the input layer of the neural network replaces the earliest part of the input data with the new input data and meanwhile adjusts an addressing sequence of the input data, thereby performing an operation on the input data and corresponding convolution kernels in an arrival sequence of the input data; and an operation result is stored in an intermediate data memory of the neural network to update corresponding data.

Calculation modes of other convolution layers of the neural network are identical to the calculation of the input layer, in which only the updated data are correspondingly calculated.

Storage compression is as follows: the intermediate data storage of the convolution layer or a depthwise-separable convolution layer are compressed into a size of a first dimension of a convolution kernel of the layer.

In the second condition, the updated row number of the input data is not equal to the convolution step size (m≠s), usually s>m and s is an integral multiple of m, due to the fact that calculation repeat of the input feature value occurs every s/m−1 frames, an intermediate operation result before the next repeated datum needs to be stored and reserved, that is, the intermediate result of the convolution operation of s/m frames of data, and meanwhile only the convolution operation related to the s/m rows of output is calculated. The condition of the setting of s<m needs to be avoided herein so as to prevent the condition of missing the input data and then resulting in errors of a recognition result. Additionally, if s/m is not an integer, although the condition of missing the input data does not occur, for correctly recognizing a result, a storage dimension of the input data needs to be enlarged besides multiplying storage of the intermediate data, resulting in sharp increase in resource consumption, such that this setting is not recommend.

Storage compression is as follows: the data storage of the input layer are compressed into a size of a first dimension of a convolution kernel of the layer, and the intermediate data storage of the convolution layer or the depthwise-separable convolution layer equals the size of the first dimension of the convolution kernel of the layer multiplied by s/m.

(3) The data reuse operation method is as follows: the original oldest m rows of data in the data memory are replaced with m rows of data updated when each frame of data arrives;

during an convolution operation, if m=s, the data addressing sequences are circularly shifted down by m bits in sequence so as to make the data correspond to each row of weight of the convolution kernel to perform a correct multiply-accumulate operation, and operation results are stored in the intermediate data memory; and if m≠s, the data addressing sequences are circularly shifted down by m bits in sequence so as to make the data correspond to each row of weight of the convolution kernel to perform a correct multiply-accumulate operation, and each operation result is stored in the intermediate data memory 1 to s/m in sequence.

(4) A calculating and storing compression method of a pooling layer is identical to the above calculating and storing compression method of the convolution layer.

(5) The calculation of a full-connection layer needs to cover all the input data, such that a data reuse mode like the convolution layer does not exist, and all the calculation results of the full-connection layer need to be reserved during actual calculation.

The present invention uses the above-mentioned technical solution and has the following beneficial effects.

(1) The data mapping method used in the present invention removes repeated calculation data existing in the keyword-spotting convolutional neural network according to the input features of the speech feature data, thereby saving the power and the calculation amount of repeated calculation and meanwhile reducing the data storage amount.

(2) The neural network circuit of the present invention cuts down the repeated calculation and storage, thereby obviously reducing the power and the area of the entire neural network circuit and reducing the complexity of the circuit.

BRIEF DESCRIPTION OF THE DRAWINGS

FIG. 8 is comparison results of the calculation amount and the storage amount before and after compression of a neural network structure shown in FIG. 7.

DESCRIPTION OF THE EMBODIMENTS

The present invention will be further elaborated hereafter in conjunction with the accompanying drawings, the present invention is applied to a convolutional neural network and transformations thereof, for example a deep separable convolutional neural network (DSCNN), particular embodiments are described below with a particular network (CNN+DSCNN) as an example, and the application of the present invention is not limited to a neural network circuit with such a structure.

Figure 1:
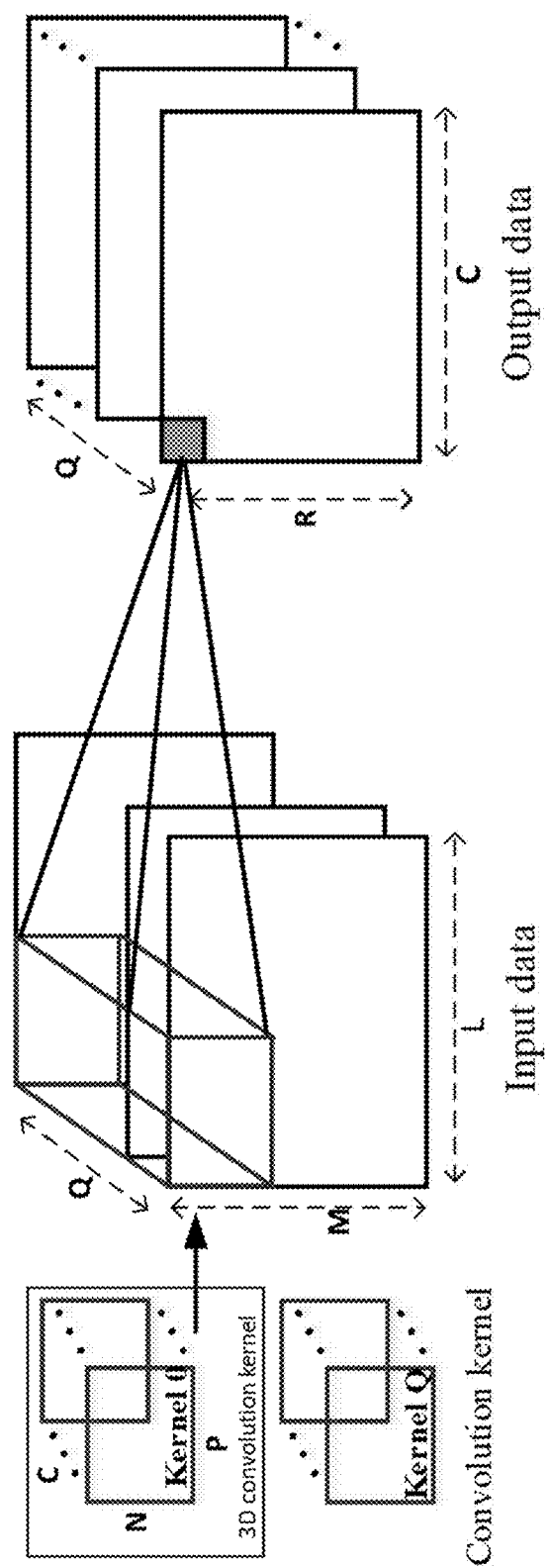
FIG. 1 is a schematic diagram of a convolution operation of a convolutional neural network.

A convolution operation process of the convolutional neural network is shown in FIG. 1. Each convolution layer usually has a plurality of convolution kernels, the convolution kernels move step by step on the same input data plane, extracted features on different positions form a plurality of different feature maps and finally form a three-dimensional array feature map. In the case that input is speech data, the convolution kernel is usually three-dimensional N*P*C (N, P and C are all integers≥1) data, wherein the first dimension N and the second dimension P are operations needed by generating an output point datum, and the third dimension C is the number of channels. In the case that input is image data, due to the fact that a colored image has three layers (even more layers), being R (red), G (green), B (blue), of data, a convolution kernel thereof has an additional fourth dimension Q (Q is an integer≥1) than that of speech application. The speech data can be treated as a particular case with Q=1.

Figure 2:
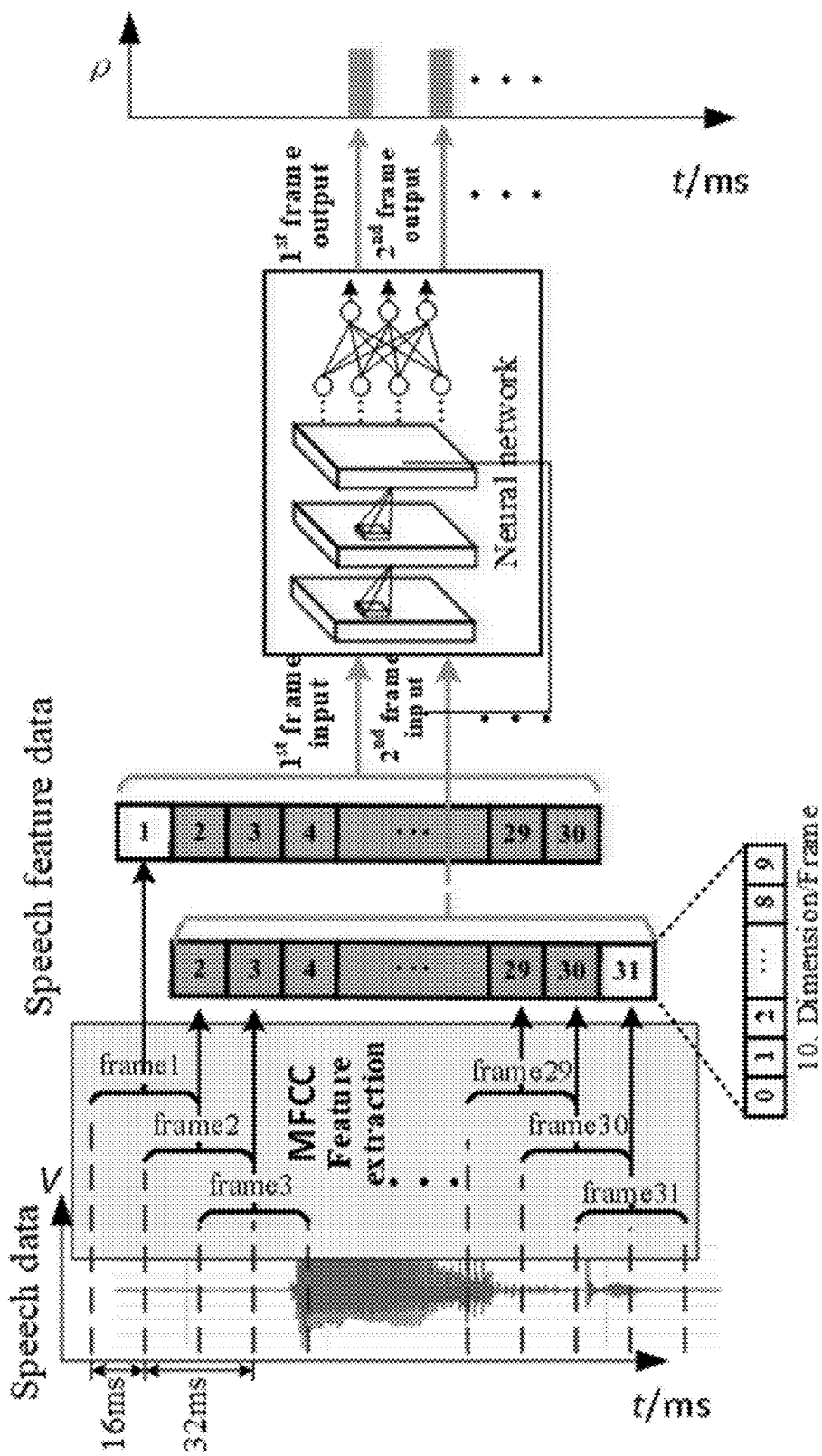
FIG. 2 is a schematic process diagram of a data flow of a keyword recognition system.

FIG. 2 is a data processing procedure of a keyword recognition circuit. Data of every T (T is a positive integer and usually ranges from 20 to 40) milliseconds of an input speech sequence are taken as one frame, V milliseconds overlap between frames, V is a positive integer<T, and an example of one frame with 32 milliseconds and overlap with 16 milliseconds is shown in the figure. A length of one word approximately ranges from 300 milliseconds to 1 second, the input data calculated one time by the neural network need to cover the entire word range and need M frames in total, and an example of M=30 is shown in the figure. That is, the input data amount of one time of calculation of the neural network is a feature vector of the M frames, and a recognition result of one time of calculating and outputting is the probability of recognizing a keyword and a filler. Due to the fact that the speech signal is a long audio clip, a start position of the keyword is not determined, and for guaranteeing that one time of the input data of the neural network can cover the length of the whole keyword, two times of the input data of the neural network usually update only one frame of feature values. The speech signal is firstly subjected to feature extraction to obtain a sequence of the feature vectors, each feature vector is a dimension K, and the feature vector of the dimension K corresponds to a frame of speech clip. When the neural network performs first calculation, the input data (Input1) are M, being 1-M, frames of feature vectors, the second calculation and the first calculation are spaced in time by a step size, that is, V milliseconds, between the frames, only m (m is an integer greater than or equal to 1) frames of feature vectors are updated on data, correspondingly, only m rows of the input data (Input2) of the second time are updated, Input2 is (1+m)-(M+m) frames of feature vectors, and each frame shifts forward by m positions on the sequence.

It can be found therefrom that two times of input data of the neural network have a large number of identical data, in M rows of feature vectors, only m rows of feature vectors are different, and the other M-m rows of feature vectors are identical, and only shift forward on the sequence. Therefore, the present invention makes use of the feature to reuse a speech feature flow, thereby omitting a large amount of repeated calculation in hardware implementation. The convolution step size may be inconsistent with the updated row number of the input data, and then the influence of the input features on calculation is analyzed under the two conditions of the convolution step sizes with Step=1 and Step=2.

Figure 3:
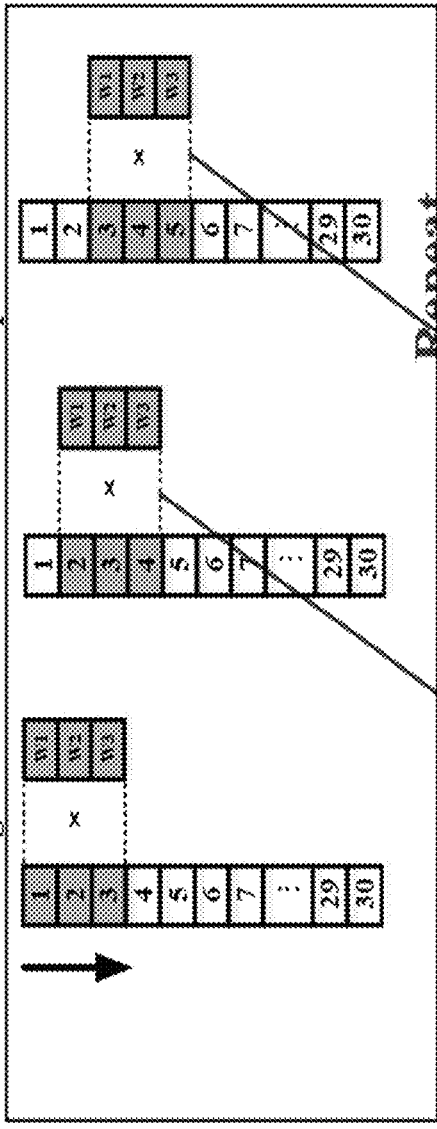
FIG. 3 is a schematic diagram of a speech feature flow reuse mode of convolution calculation with a step size being 1.
Figure 3:
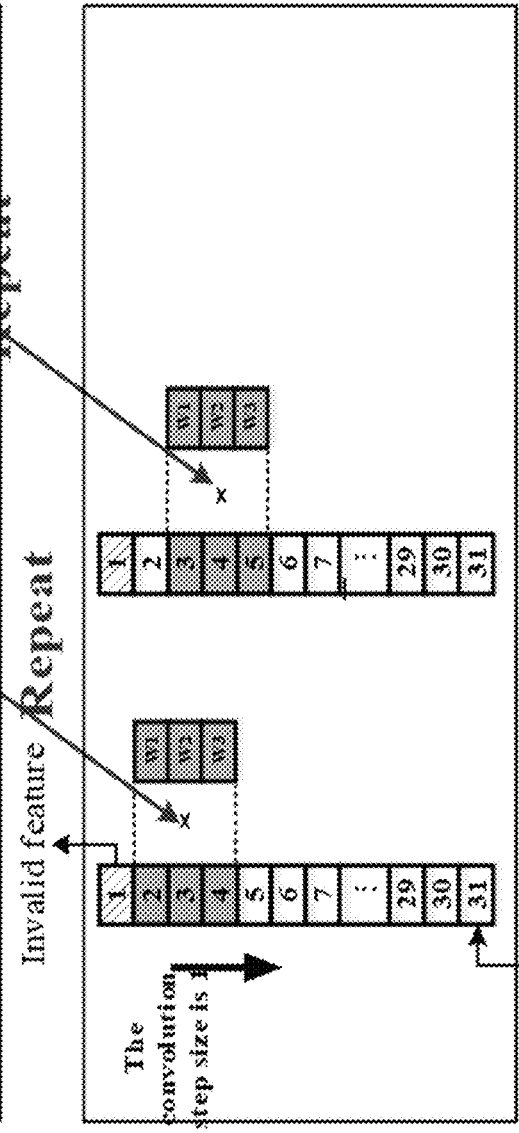

FIG. 3 is a speech feature flow reuse mode during convolution calculation with the step size being 1. The convolution kernel is the three-dimensional N*P*C, and the three-dimensional N*P*C is simplified as N vectors, wherein N is an integer greater than 1, and the dimension of each vector Wi (i=1-N) is P*C. With N=3 and Step=1 as an example, the N vectors are composed of W1, W2, W3. As shown in FIG. 3, with M=30 as an example, the first step of calculation of the first input (Input1) is to multiply and accumulate the feature vectors 1, 2, 3 and W1, W2, W3 respectively, the second step of calculation is to multiply and accumulate the feature vectors 2, 3, 4 and W1, W2, W3 respectively, and so on for the subsequent calculation steps; and the first step of calculation of the second input (Input2) is to multiply and accumulate the feature vectors 2, 3, 4 and W1, W2, W3 respectively, which is identical to the second step of calculation of Input1, and the second step of calculation of Input2 is to multiply and accumulate the feature vectors 3, 4, 5 and W1, W2, W3 respectively, which is identical to the third step of calculation of Input1. It can be found therefrom that in all the calculation steps of Input2, only the last step of convolution calculation (multiplying the feature vectors 29, 30, 31 and W1, W2, W3 respectively) is different from before, and the other calculation processes overlap the calculation of Input1.

Figure 4:
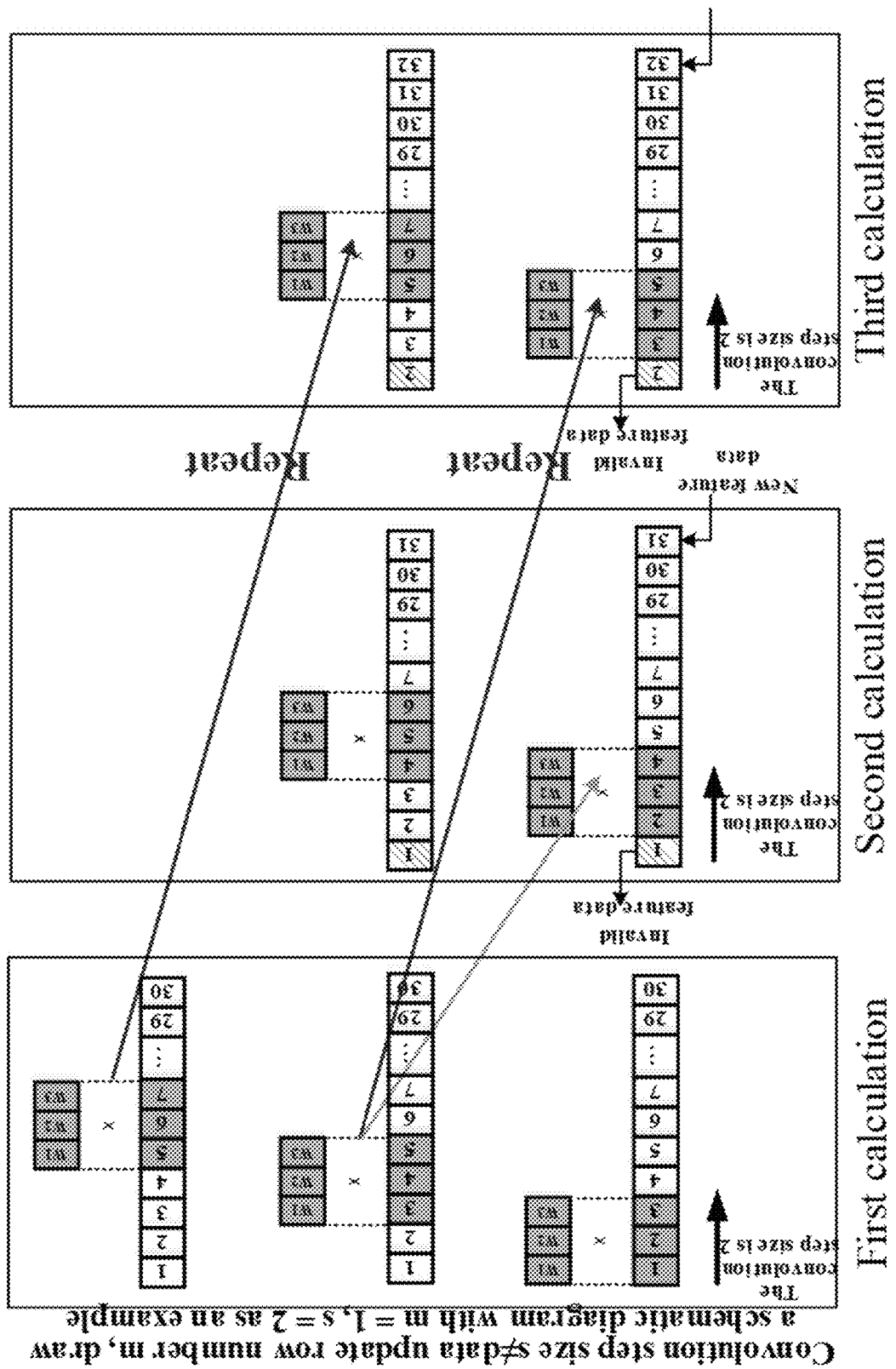
FIG. 4 is a schematic diagram of the speech feature flow reuse mode of the convolution calculation with the step size being 2.

FIG. 4 is the speech feature flow reuse condition during convolution calculation with the step size being 2. The entire calculation process of Input2 does not overlap the calculation process of Input1 any more, but calculation of the third input (Input3) overlaps the calculation process of the first input (Input1). By parity of reasoning, if only one row of the input is updated every time and the convolution step size Step=s, calculation of the k-th input greatly overlaps calculation of the (k+s) th input. The updated row number of the input data is inconsistent with the convolution step size, resulting in the condition of repeated calculation of different modes. Accordingly, a universal conclusion is obtained that assuming m rows of the input data are updated every time and the convolution step size is s, the calculation repeat occurs every s/m−1 input.

As for the condition that the step size is s (s is not equal to m), due to the fact that the calculation repeat occurs every s/m−1 input, intermediate operation results need to be stored and reserved, that is, the intermediate results are reserved s/m times. The effect of reduction of a memory space in this condition is poorer than that in a condition of s=m. Therefore, during neural network architectural design, s is should not be too large.

As for a network structure with continuous convolution layers, the present invention can not only save the repeated calculation amount, but also save a large amount of storage of an output result of each layer, because the output result of the present layer is calculated in the calculation of the last input.

Figure 5:
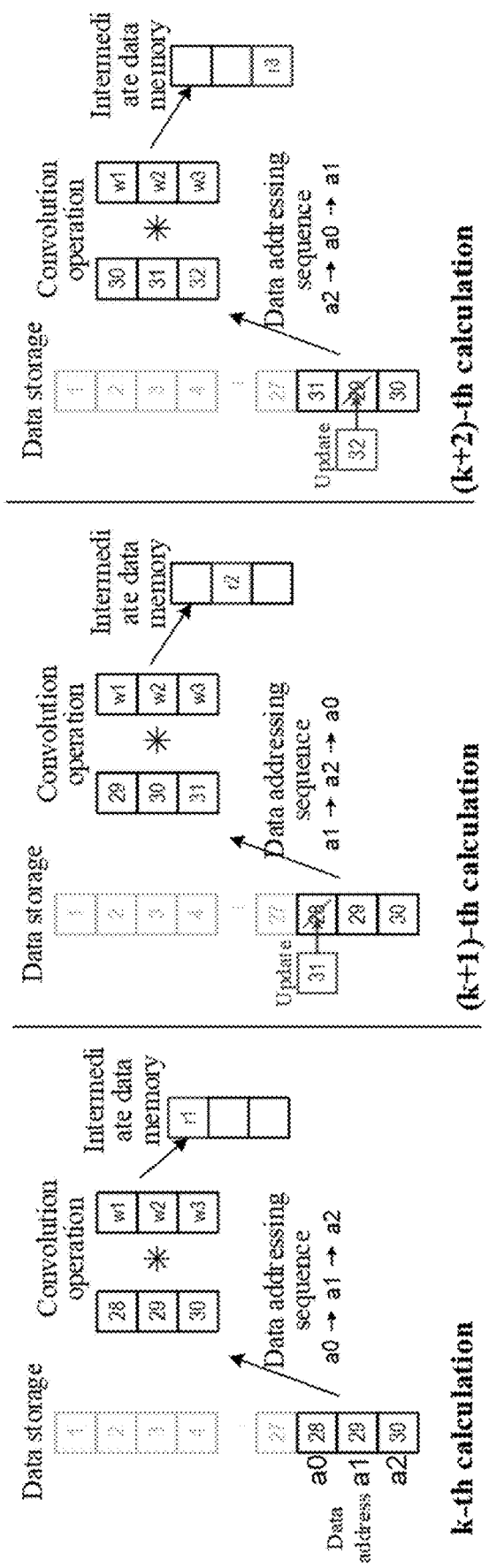
FIG. 5 is a schematic diagram of a data reuse operation method of the convolution calculation with the step size being 1.

FIG. 5 is a data reuse operation method of the convolution calculation with the step size identical to the updated row number of data. With the step size being 1 as an example, when each frame of data arrives, only one row of data is updated, the original oldest row of data in the data memory is replaced with the newest row of data. During convolution operation, the present invention sequentially makes the addressing sequences circularly shift down by one bit so as to make the data correspond to each row of weight of the convolution kernel to perform a correct multiply-accumulate operation. As shown in FIG. 5, assuming that the initial 28th, 29th, 30th frames of data are stored in data memories with a0, a1, a2 as addresses in sequence, the data addressing sequence of the k-th convolution calculation is a0→a1→a2. The data addressing sequence of the (k+1)-th convolution calculation is a1→a2→a0, the data addressing sequence of the (k+2)-th convolution calculation is a2→a0→a1, then the data addressing sequence of the (k+3)-th convolution calculation regresses to a0→a1→a2, and the operations are circulated, such that the addressing sequence of the data is consistent with the addressing sequence of the weight.

Figure 6:
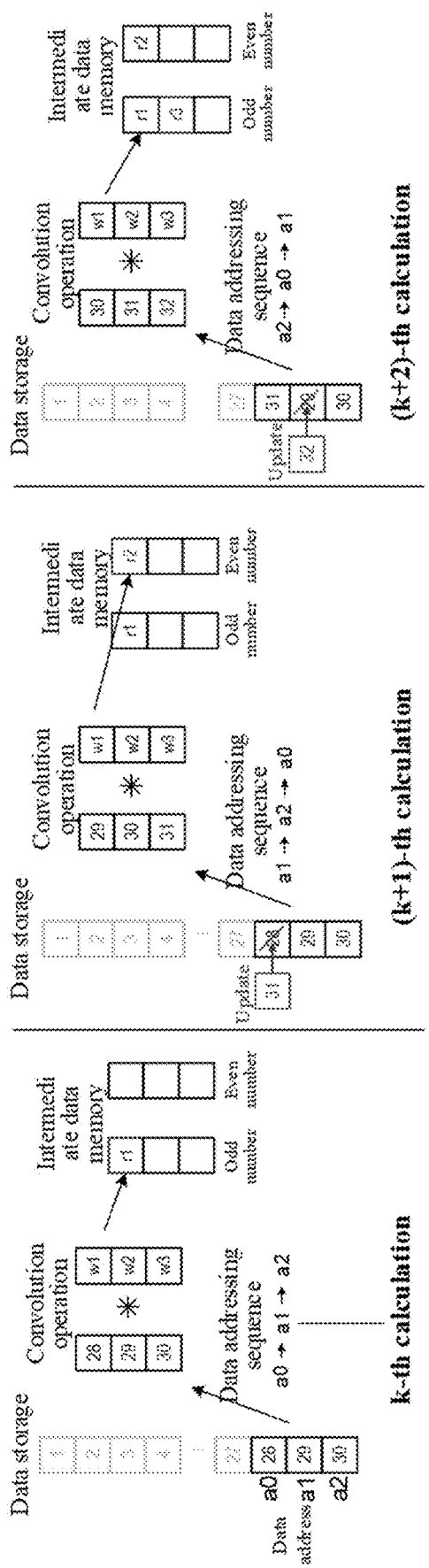
FIG. 6 is a schematic diagram of the data reuse operation method of the convolution calculation with the step size being 2.

FIG. 6 is the data reuse operation method of the convolution calculation with the step size not identical to the updated row number of data. With the step size being 2 and the updated row number being 1 as an example, when each frame of data arrives, only one row of data is updated, and the original oldest row of data in the data memory is replaced with the newest row of data. During convolution operation, the step size s=2, such that in a conventional convolution operation, the data of each time shift down by two rows and then are subjected to convolution operation with the weight of the convolution kernel. According to the analysis of FIG. 4, the present invention sequentially makes the addressing sequences circularly shift down by one bit so as to make the data correspond to each row of weight of the convolution kernel to perform a correct multiply-accumulate operation. Different from FIG. 5 in which the step size is equal to the updated row number, there are two blocks of intermediate data memories, the first block of intermediate data memory stores a convolution operation result operated for the odd-numbered time, and the second block of intermediate data memory stores a convolution operation result operated at the even-numbered time. As shown in FIG. 6, assuming that the initial 28th, 29th, 30th frames of data are stored in the data memories with a0, a1, a2 as addresses in sequence, the data addressing sequence of the k-th convolution calculation is a0→a1→a2, and the convolution operation result is stored in the first block of intermediate data memory. The data addressing sequence of the (k+1)-th convolution calculation is a1→a2→a0, and the convolution operation result is stored in the second block of intermediate data memory. The data addressing sequence of the following (k+3)-th convolution calculation regresses to a0→a1→a2, and the convolution operation result is stored in the first block of intermediate data memory. The operations are circulated, such that the addressing sequence of the data is consistent with the addressing sequence of the weight.

Figure 7:
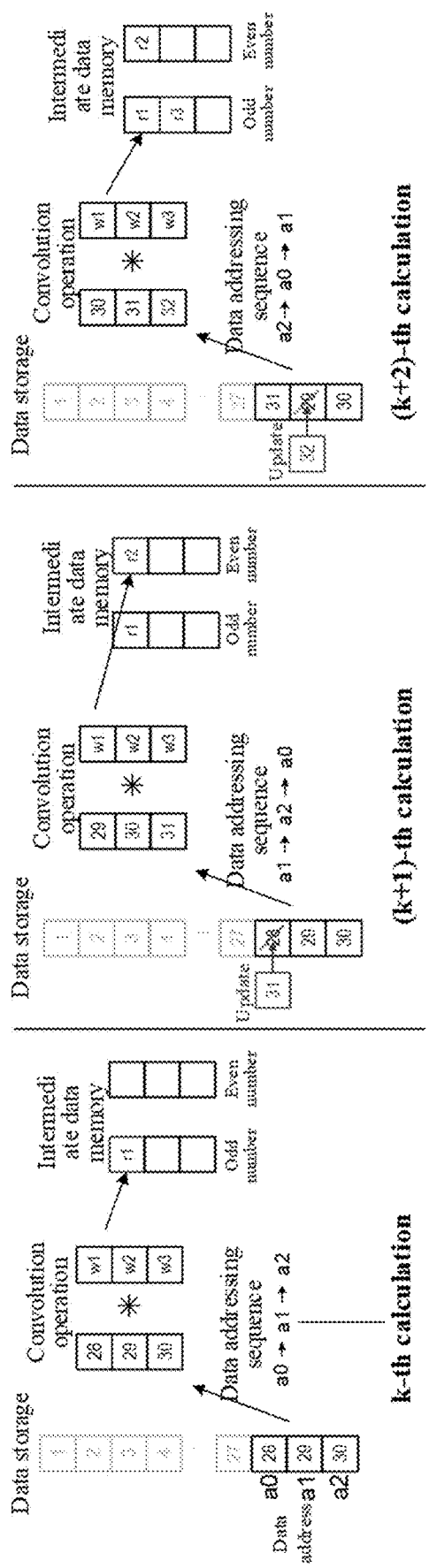
FIG. 7 is a schematic diagram of a compression condition and an update condition of stored input data or intermediate data of the present invention.

As shown in FIG. 7, the input data or the intermediate data stored by the present invention are shown in a black box below, and compared with a scheme of storing the entire word, a memory space of a dotted part is saved. Meanwhile, when each frame of new data arrives, only one row needs to be updated, which is shown in a shaded part, such that the dynamic power of the memory is further reduced. As for the data update of the shaded part, when each frame of new data arrives, the earliest data in the memory are replaced with the new data.

One Particular Embodiment

In the particular embodiment below, the speech feature reuse-based storing and calculating compression method for the keyword-spotting convolutional neural network is applied to a particular depthwise-separable convolutional neural network for performing keyword spotting.

An overall structural diagram of the depthwise-separable neural network is shown as FIG. 7 and includes one convolution layer, one depthwise-separable convolution layer, one pooling layer and one full-connection layer, and except the first convolution layer uses an 8-bit input bit width, the remaining layers of data are all binarized 1-bit data. The network scale and the size of the convolution kernel of each layer are marked on the figure.

In this neural network circuit, a reduction effect of the data storage scale is obvious, as shown in FIG. 7, a gray box is the saved data size, and the black box is the actually-stored data size, wherein in the stored data, only one row needs to be updated every time of calculation, which is shown in the shaded part, such that the dynamic power of the memory is further reduced. As for the data update of the shaded part, when each frame of new data arrives, the earliest data in the memory are replaced with the new data. With the input data as an example, before data reuse, all the input data need to be stored, with the scale being 10×30; if a data reuse mode of the speech feature flow is used, a longitudinal step size of the first convolution layer is 1, such that a large amount of repetition exists between two adjacent times of input during convolution calculation, when a new frame of data arrives, only the first row of input features is updated, that is, in twenty rows of output data, only the first row of data is new, and the remaining nineteen rows of data are obtained by calculation of the last frame, such that when the input speech feature data are stored, only the first ten rows of data (the convolution kernel of the first layer is 10×4) related to the first row of output calculation need to be stored, and the storage scale is 10×10, which is cut down to ⅓ of a storage scale before reuse. Similarly, besides the convolution layer, in the depthwise-separable convolutional neural network, the input data of the depthwise-separable convolution layer, a channel fusion convolution layer and the pooling layer may be cut down.

A table of FIG. 8 shows a comparison of the calculation amount and the storage amount of the neural network structure used by the system before and after performing the speech feature flow reuse mode. It can be seen from the comparison that by means of the speech feature flow reuse mode, the calculation frequency of the neural network, particularly the convolution calculation part are dramatically cut down, the calculation amount of the first layer of 8-bit input data is cut down to 5% of the calculation amount before reuse, and the calculation amount of the later layers of 1-bit data is cut down to 7.34% of the calculation amount before reuse. The storage of the intermediate data is obviously cut down, and the memory space is cut down to 28.6% of the memory space before reuse. A parameter size remains unchanged compared with that before reuse, and in addition, the reuse mode does not change a network structure and the calculation result actually, such that the recognition rate of the neural network is not influenced.

What is claimed is:

1. A speech feature reuse-based storing and calculating compression method for a keyword-spotting CNN (convolutional neural network) comprising the following steps:
   i) reducing an input data storage, wherein each frame of speech is represented as row of data, a previous frame of input data is replaced with an updated row data of data of a new frame, instead of replacing all frames of data, which reduces the input data storage; an addressing sequence of an updated input data is adjusted to perform an operation on the updated input data which comprises circularly shifting the addressing sequence down by m bits, m being the updated row number of the input data;
   ii) reducing an intermediate data, wherein the calculation results between the input data and the convolution kernel, are updated to correspond to a convolution result of the updated row data of the input data under the two conditions that the updated row number of the input data is equal to a convolution step size and the updated row number of the input data is not equal to the convolution step size, wherein the input data is updated R rows, the convolution step size is S, each layer only stores one memory space, when the updated row number of the input data is equal to the convolution step size (R=S); the intermediate data is directly updated into the convolution result obtained by adjusting the addressing order of the input data, the each layer being capable of storing a convolution kernel size of a next layer, when the updated row number of the input data is not equal to the convolution step size (R≠S), retain the convolution results of duplicate input data; thus, a dynamic power of a circuit is reduced by avoiding repeatedly updating intermediate data; and
   iii) compressing a data storage of an input layer based on an updated row number of the input data and the convolution step size, which reduces the memory cost of the circuit.

2. The speech feature reuse-based storing and calculating compression method for the keyword-spotting CNN according to claim 1, wherein the compression is based on if the updated row number of the input data is equal to the convolution step size;
   wherein when the updated row number of the input data is equal to the convolution step size, the number of stored rows of the input data is compressed into a size of a first dimension of a convolution kernel of this layer, and a convolution operation result of each step is compressed into the size of the first dimension of the convolution kernel of the layer;

wherein when the updated row number of the input data is not equal to the convolution step size, data storage of the input layer is compressed into a size of a first dimension of a convolution kernel of this layer, the intermediate data of each convolution layer is stored as K times of the size of the first dimension of the convolution kernel of this layer, K being a ratio of the convolution step size to the updated row number of the input data.

\* \* \* \* \*